United States Patent [19]
Föhl

[11] 4,159,120
[45] Jun. 26, 1979

[54] PASSIVE RESTRAINING SYSTEM

[75] Inventor: Arthur Föhl, Haubersbronn, Fed. Rep. of Germany

[73] Assignee: REPA Feinstanzwerk GmbH, Alfdorf, Fed. Rep. of Germany

[21] Appl. No.: 607,912

[22] Filed: Aug. 26, 1975

[30] Foreign Application Priority Data

Aug. 26, 1974 [DE] Fed. Rep. of Germany ....... 2440843

[51] Int. Cl.² ............................................. A62B 35/00
[52] U.S. Cl. .................................. 280/806; 296/65 A
[58] Field of Search ........................ 280/744, 746, 747; 296/65 A; 297/216

[56] References Cited

U.S. PATENT DOCUMENTS

| | | | |
|---|---|---|---|
| 3,992,046 | 11/1976 | Braess | 296/65 A |
| 4,025,110 | 5/1977 | Poorman | 280/744 X |

Primary Examiner—Joseph F. Peters, Jr.
Assistant Examiner—Norman L. Stack, Jr.
Attorney, Agent, or Firm—Herbert L. Lerner

[57] ABSTRACT

Passive restraining system for securing a seated vehicle passenger with a safety belt firmly holding the passenger in his seat includes vehicle parts displaceable relative to one another in dependence upon a retardation in the vehicle velocity, for tightening the safety belt which is connected to the vehicle parts.

5 Claims, 3 Drawing Figures

PASSIVE RESTRAINING SYSTEM

The invention relates to a passive restraining system for securing seated vehicle passengers with a safety belt firmly holding the passengers on a seat in the event of an accident.

The heretofore known restraining system having safety belts are constructed so that the belt or belts lie loosely on the body of the passenger that is to be secured. A consequence thereof is that the upper part of the body of the passenger is bent at the hip and thrown forwardly, the head of the passenger being accordingly subjected to high velocities that can cause dangerous whiplash effect, a consequence of which may be severe damage to the vertebra.

To minimize this danger, it has been proposed heretofore to tighten the belt or belts in the event of an accident. The means for accomplishing this, such as explosive or blasting compositions, that are ignited by a sensor and effect belt-tightening through a piston system are relatively costly. Furthermore, the safety factor is adversely affected due to the large number of cooperating elements that are required.

It is accordingly an object of the invention to provide a restraining system of the aforedescribed type wherein the belt securing the seated passenger is tightened, in the event of an accident, in a relatively simple and trouble-free manner, to such an extent that the upper part of the body of the seated passenger is not bent forward or bent forwardly only slightly.

With the foregoing and other objects in view, there is provided, in accordance with the invention, a passive restraining system for securing a seated vehicle passenger with a safety belt firmly holding the passenger in his seat comprising vehicle parts displaceable relative to one another in dependence upon a retardation in the vehicle velocity for tightening the safety belt that is connected to the vehicle parts.

In accordance with another feature of the invention, means are provided for blocking the relative displacement of the vehicle parts until a given retardation of the vehicle velocity is effected.

In accordance with a further feature of the invention, the vehicle seat is mounted on a vehicle chassis so as to be displaceable in travel direction of the vehicle relative to the vehicle chassis, the safety belt having at least one attachment end thereof securely fastened to the vehicle chassis.

In accordance with yet another feature of the invention, means are provided for limiting the displacement of the seat relative to the vehicle chassis.

Due to the fact that at given forces which retard the velocity of the vehicle, such as occur in the event of an accident or of a near-accident, namely due to a collision or due to braking of the vehicle, vehicle parts, such as the vehicle seat especially, are displaced relative to the vehicle chassis, and this relative displacement is utilized to tighten or render taut the safety belt which lies initially loosely on the body of the seated passenger that is to be secured, which prevents, in a most simplified manner, the forward tilting of the upper part of the body of the seated passenger at the occurrence of an accident or a sudden stop that can cause a dangerous whiplash injury.

Especially advantageous conditions are provided when the relative displacement of the seat and the vehicle chassis are used for energy transformation whereby the seated passenger to be secured largely maintains his original disposition.

The principle of the invention is applicable for passive restraining systems and can, if necessary or desired, be supplemented by auxiliary restoring tightening devices, automatic roll-up devices and energy transformation devices. The basic principle of the invention is applicable both to simple belts as well as to other belt systems such as three-point safety belts and so-called pants-suspender belts.

It is especially advantageous for three-point or pants-suspender belts, and in accordance with the invention, to have the shoulder belt extend over two reversing or diverting rollers that are mounted within the rigid back-support of the seat, and be connected to a fixed automatic wind-up device.

A prerequisite for the effective operation or efficiency of the invention is that, in the embodiment thereof wherein a seat is displaceable relative to the vehicle chassis, at least one point of attachment of the belt is securely fastened to the vehicle chassis.

Other features which are considered as characteristic for the invention are set forth in the appended claims.

Although the invention is illustrated and described herein as embodied in a passive restraining system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
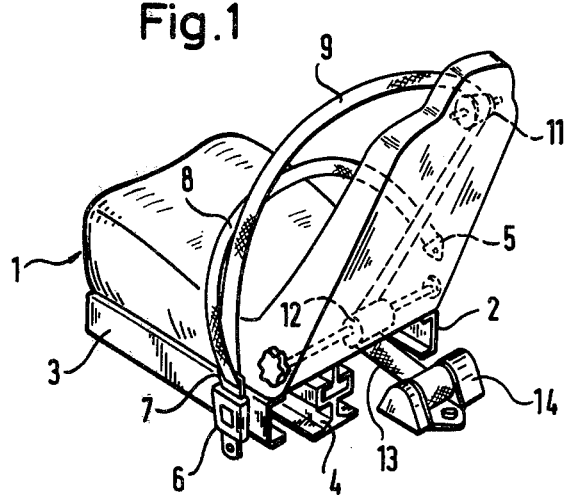
FIG. 1 is a perspective view of a vehicle seat incorporating the passive restraining system according to the invention, the seat being displaceable in direction of displacement of the vehicle on which it is mounted.

Referring now to the drawing, there is shown therein a vehicle seat 1 mounted in a vehicle on guide rails 2, 3, displaceable in travel direction of the vehicle. A center guide 4 is provided for affording an exact rectilinear guidance of the seat. As shown, the center guide is formed of a rail having a T-shaped cross-section secured to the underside of the seat and slideably received in a correspondingly formed channel-shaped member secured to the chassis of the vehicle. An end 5 of the restraining system of the invention which includes a lap or pelvic belt 8 and a shoulder belt 9 as well as a belt lock 6 located at the opposite side of the seat, from the end 5, an insert tongue 7 of the three-point seat belt 8, 9 being lockable in the lock 6. The insert tongue 7 simultaneously forms a return mounting for the three-point safety belt formed of the lap belt 8 and the shoulder belt 9.

Figure 2:
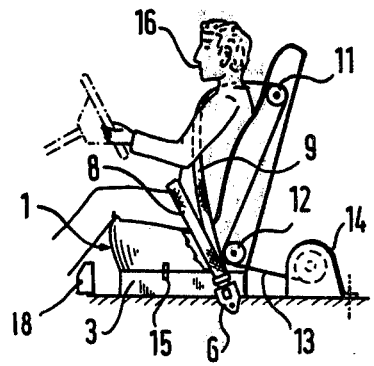
FIG. 2 is a side elevational view, at a reduced scale, of the vehicle seat of FIG. 1 in normal setting thereof.
Figure 3:
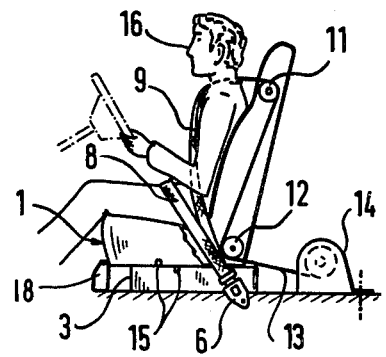
FIG. 3 is a view similar to that of FIG. 2 showing the vehicle seat after a predetermined delay limit has been exceeded.

The shoulder belt 9 extends over a reversing or diverting roller 11 mounted in the seat backrest set in the rigid position of FIG. 2 or in the more upright position of FIG. 3 and over a second reversing roller 12 located in the rear bottom region of the seat 1 and coupled with a connecting belt portion 13 to an automatic roll-up device 14 of conventional construction fixed as by rivets to the chassis of the vehicle.

During normal conditions, the secured passenger 16 in the seat 1 assumes the position shown in FIG. 2, the lap belt 8 and the shoulder 9 lying loosely on his body. In the event of an accident such as a head-on collision or even a braking of the vehicle, to avoid a collision, a shear pin 15, initially locking the seat, and dimensioned so as to withstand a given retardation of the vehicle velocity before shearing, shears off and frees the seat 1 so that it slides into the position shown in FIG. 3. As seen in FIG. 3, seat 1 and seated passenger move forward. As a result the distance between roller 12 and roll-up device 14 increases, i.e. a longer connecting belt portion 13 is required. Since the belt cannot be further unwound, the effect of moving seat 1 forward is to pull belts 8 and 9 to provide for the required increased length of connecting belt 13. This, of course, brings belts 8 and 9 taut about the body of the passenger, as he moves forward with the seat. Consequently, both the lap or pelvic belt 8 and the shoulder belt 9 are made taut so that the body of the seated passenger 16 maintains its original disposition and changes only its total location in accordance with the travel of the seat 1 along the guide rails 2, 3. Naturally the travel of the seat 1 must be limited. This is effected by a fixed stop or abutment 18. The automatic belt roll-up device 14 can be provided together with an energy transformation device in a conventional manner; however, it is also possible to install such a transformation device at other locations of the system.

There is claimed:

1. A restraining system for securing a seated vehicle passenger with a safety belt firmly holding the passenger in his seat, comprising in combination a seat belt restraining system and movable seat wherein the vehicle seat is mounted on guide members attached to the floor of the vehicle, retaining means normally holding said seat in fixed position relative to said guide members and blocking the relative displacement of the seat in the travel direction of the vehicle until a given retardation of the vehicle velocity is effected, said safety belt coupled to a roll-up device securely fastened to the chassis of the vehicle with said safety belt normally lying loosely on the passenger's body, said seat moving in the travel direction of the vehicle relative to said guide members when said given retardation of the vehicle velocity is effected with concomitant movement of the passenger in the travel direction causing the passenger to move forward against said loosely fitting safety belt resulting in the safety belt becoming taut relative to the passenger whereby the body of the seated passenger maintains its original disposition and changes only its total location in accordance with the travel of the seat along the guide members.

2. A restraining system according to claim 1, wherein the safety belt includes a lap belt and a shoulder belt to form a three-point safety belt.

3. A restraining system according to claim 1, wherein the guide members are two spaced guide rails parallel to the longitudinal axis of the vehicle body and a center guide rail parallel to and between the two spaced guide rails.

4. A restraining system according to claim 1, wherein said retaining means is a shear pin inserted in a slot at the interface of the bottom of the seat and the top of the guide member to block relative displacement of the seat until a given retardation of the vehicle velocity is effected.

5. A restraining system according to claim 1 including means for limiting the displacement of said seat relative to the vehicle chassis.

* * * * *